United States Patent [19]

Qureshi et al.

[11] Patent Number: 4,567,216

[45] Date of Patent: Jan. 28, 1986

[54] THERMOPLASTIC MODIFIED EPOXY COMPOSITIONS

[75] Inventors: Shahid Qureshi, Edison; Hugh C. Gardner, Somerville, both of N.J.

[73] Assignee: Union Carbide Corporation, Danbury, Conn.

[21] Appl. No.: 564,393

[22] Filed: Dec. 22, 1983

[51] Int. Cl.$^4$ .......................... C08L 63/00; C08K 3/00
[52] U.S. Cl. .................................... 523/400; 523/440; 523/466; 523/468; 523/445; 525/415; 525/396; 525/423
[58] Field of Search ....................... 525/415, 396, 423; 523/400, 440, 466, 468, 445

[56] References Cited

U.S. PATENT DOCUMENTS

| | | | |
|---|---|---|---|
| 3,763,088 | 10/1973 | Izawa et al. | 525/396 |
| 3,920,768 | 11/1975 | Kwiatkowski | 525/423 |
| 3,957,716 | 8/1976 | Weldy | 525/87 |
| 4,118,535 | 10/1978 | Banucci et al. | 525/423 |
| 4,222,918 | 9/1980 | Zentner et al. | 525/376 |
| 4,330,659 | 5/1982 | King et al. | 525/99 |

FOREIGN PATENT DOCUMENTS

| | | |
|---|---|---|
| 2052225 | 5/1971 | Fed. Rep. of Germany . |
| 0011360 | 1/1984 | Japan . |
| 1306231 | 2/1973 | United Kingdom . |

OTHER PUBLICATIONS

Addition of Polyethersulphone to Epoxy Resins, *British Polymer J.*, vol. 15, 1983, Bucknall et al No. 75.
Proceeding of the 28th National *Sample Symp.* 4/12-14/83 pp. 367-373, Rayhava.
Chem. Abstract 116842u-Weldy vol. 83(14), Carbon Fibers with Coating Compositions Applied to them.
Chem. Abstract 51332h-Stackhouse et al. vol. 71(12), Electrical Insulation from Mica . . . Condensate.

*Primary Examiner*—John Kight
*Assistant Examiner*—Garnette D. Draper
*Attorney, Agent, or Firm*—Steven T. Trinker

[57] ABSTRACT

Described herein is a composition which contains bis(2,3-epoxycyclopentyl) ether, a specific group of hardeners and a specific group of thermoplastics. When cured, these compositions have improved tensile properties as compared to similar compositions which do not contain thermoplastics.

21 Claims, No Drawings

THERMOPLASTIC MODIFIED EPOXY COMPOSITIONS

BACKGROUND OF THE INVENTION

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured resin. Resin systems containing an epoxide resin and aromatic amine hardener are often used in prepreg since they possess the balance of properties required for this composite fabrication process. State-of-the-art epoxy/carbon fiber composites have high compressive strengths, good fatigue characteristics, and low shrinkage during cure. However, since most epoxy formulations used in prepreg are brittle, these composites have poor impact resistance and tensile properties which do not fully translate the properties of the reinforcing fiber. Thus, there is a need for resin systems which afford composites with improved tensile and impact properties.

In the prior art, there are two references to the attempted toughening of epoxy resin systems by adding thermoplastic polymers. These were not successful. Specifically, polyethersulfone modification of a tetraglycidyl methylene dianiline/4,4'-diaminodiphenyl sulfone did not improve toughness (British Polymer Journal, 15, pages 71 to 75; Proceedings of the 28th National SAMPE Synposium, April 12 to 14, 1983, pages 367 to 373).

THE INVENTION

It has now been found that a composition which contains a select epoxy resin and a specific group of hardeners has improved tensile properties when modified with a specific group of thermoplastics. Fiber-reinforced composites made with the compositions of this invention have improved toughness as compared to composites which do not contain the select group of thermoplastics.

The composition comprises:

(a) an epoxy resin which comprises bis(2,3-epoxycyclopentyl) ether, (b) a specific group of hardeners selected from one or more of the following: 4,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, 3,3'-diaminobenzophenone, m-phenylenediamine, p-phenylenediamine, 4,4'-diaminodiphenylpropane, 4,4'-diaminodiphenyl sulfide, 1,4-bis(p-aminophenoxy)benzene, 1,4-bis(m-aminophenoxy)benzene, 1,3-bis-(m-aminophenoxy)benzene, 1,3-bis(p-aminophenoxy)benzene, adducts of epoxy resins with the above diamines, such as the adduct formed by reacting one mole of a liquid bisphenol-A epoxy resin with 2 to 4 moles of m-phenylenediamine by itself or in combination with 4,4'-diaminodiphenyl methane or the adducts of a bisphenol-A epoxy resin with a molar excess of 4,4-diaminodiphenyl sulfone, as described in U.S. Pat. No. 4,330,659.

(c) a select group of thermoplastics selected from one or more of the following: polycaprolactone, polyetherimide, phenoxy, polyarylether of the formula:

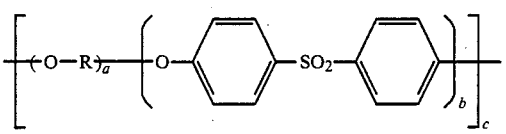

wherein R is a residuum of hydroquinone, dihydroxydiphenyl sulfone or 4,4'-biphenol, a is 1, b is 1 or greater, and c is 5 to 100.

The composition may optionally contain a structural fiber.

The epoxy resin (i.e., component a) is present in ten isomeric forms some of which are liquid and some of which are solids at room temperature. The solid isomers have structures such as II, III, IV and were commercially available as ERRA-0300 from Union Carbide Corporation:

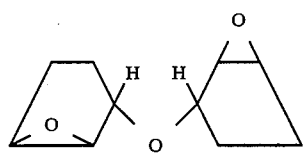

(II)

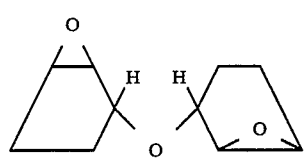

(III)

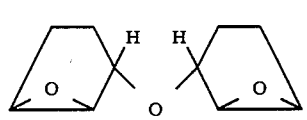

(IV)

The predominant liquid isomers were available as ERLA-400 from Union Carbide Corporation and have the structures, V, VI, VII, and VIII.

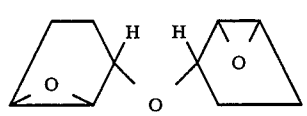

(V)

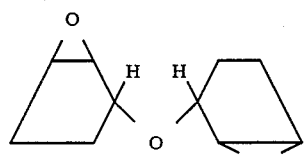

(VI)

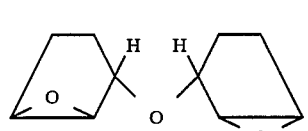

(VII)

-continued

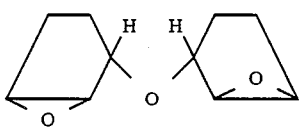

Other isomers are the following

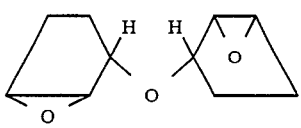

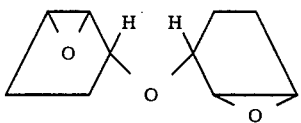

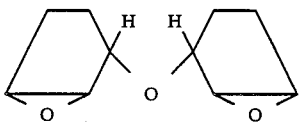

Epoxy resin ERR-4205 from Union Carbide Corporation contains about 60% of the solid isomers and 40% of the liquid isomers.

The bis(2,3-epoxycyclopentyl)ether may be used in combination with other epoxides which contain two or more epoxy groups having the following formula:

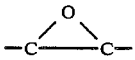

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl) propane, also known as bisphenol A, and have structures such as XII,

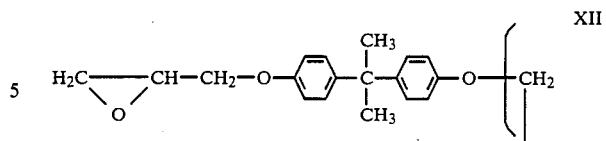

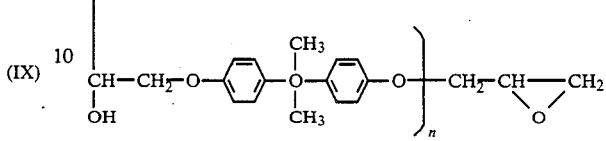

where n has a value from about 0 to about 15. These epoxides are bisphenol-A epoxy resins. They are available commercially under the trade names such as "Epon 828," "Epon 1001", and "Epon 1009" from Shell Chemical Co. and as "DER 331", "DER 332", and "DER 334" from Dow Chemical Co. The most preferred bisphenol A epoxy resins have an "n" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 4,2'-biphenol, or tris(4-hydroxyphenyl) methane and the like, are useful in this invention. In addition, EPON 1031 (a tetraglycidyl derivative of 1,1,2,2-tetrakis(hydroxyphenyl)ethane from Shell Chemical Company), and Apogen 101, (a methylolated bisphenol A resin from Schaefer Chemical Co.) may also be used. Halogenated polyglycidyl compounds such as D.E.R. 580 (a brominated bisphenol A epoxy resin from Dow Chemical Company) are also useful. Other suitable epoxy resins include polyepoxides prepared from polyols such as pentaerythritol, glycerol, butanediol, or trimethylolpropane and an epihalohydrin. Commercial examples of the latter is a triglycidyl ether of an aliphatic polyvol (WC-84 from Wilmington Chemicals, Wilmington, Delaware) and Araldite A-508 a blend of a diglycidyl ether of an aliphatic polyol with a liquid bisphenol-A epoxy resin which is sold by Ciba-Geigy.

Polyglycidyl derivatives of phenol-formaldehyde novolaks such as XIII where n=0.1 to 8 and cresol-formaldehyde novolaks such as XIV where n=0.1 to 8 are also useable.

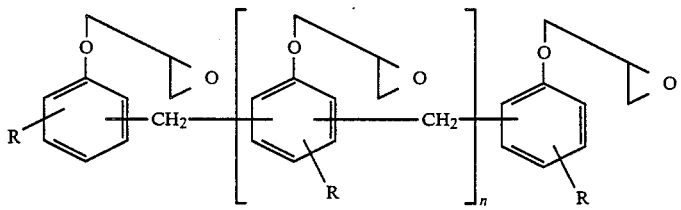

XIII R = H
XIV R = CH$_3$

The former are commercially available as D.E.N. 431, D.E.N. 438, and D.E.N. 485 from Dow Chemical Company. The latter are available as, for example, ECN 1235, ECN 1273, and ECN 1299 (obtained from Ciba-Geigy Corporation, Ardsley, N.Y.). Epoxidized novolaks made from bisphenol A and formaldehyde such as SU-8 (obtained from Celanese Polymer Specialties Company, Louisville, Ky.) are also suitable.

Other polyfunctional active hydrogen compounds besides phenols and alcohols may be used to prepare the polyglycidyl adducts of this invention. They include amines, aminoalcohols and polycarboxylic acids.

Adducts derived from amines include N,N-diglycidyl aniline, N,N-diglycidyl toluidine, N,N,N',N'-tetraglycidylxylylene diamine, (i.e., XV) N,N,N',N'-tetraglycidyl-bis (methylamino) cyclohexane (i.e. XVI), N,N,N',N'-tetraglycidyl-4,4'-diaminodiphenyl methane, (i.e. XVII) N,N,N',N'-tetraglycidyl-3,3'-diaminodiphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, Calif.), Araldite MY-720 (obtained from Ciba Geigy Corporation) and PGA-X and PGA-C (obtained from The Sherwin-Williams Co., Chicago, Ill.).

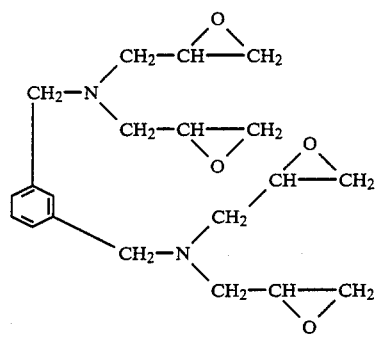

XV

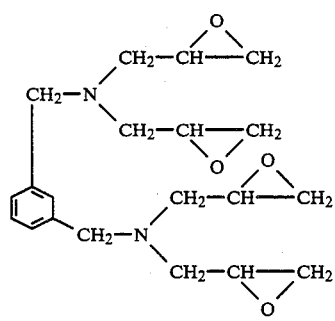

XVI

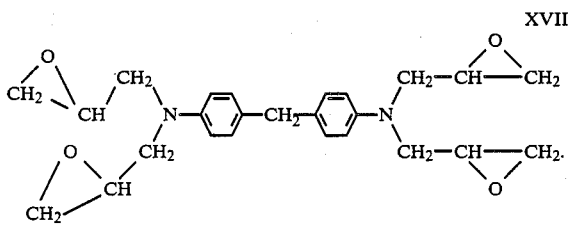

XVII

Suitable polyglycidyl adducts derived from amino alcohols include O,N,N-triglycidyl-4-aminophenol, available as Araldite 0500 or Araldite 0510 (obtained from Ciba Geigy Corporation) and O,N,N-triglycidyl-3-aminophenol (available as Glyamine 115 from F.I.C. Corporation).

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethylcyclopentasiloxane and the diglycidyl ether of 1,3-bis-(3-hydroxypropyl)tetramethyldisiloxane) are also useable.

The second group of epoxy resins is prepared by epoxidation of dienes or polyenes. Resins of this type include

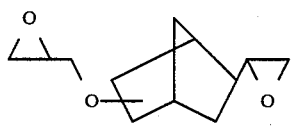

XVIII copolymers of bis(2,3-epoxycyclopentyl)ether with ethylene glycol which are described in U.S. Pat. No. 3,398,102, 5(6)-glycidyl-2-(1,2-epoxyethyl)bicyclo[2.2.1] heptane, XVIII, and dicyclopentadiene diepoxide. Commercial examples of these epoxides include vinycyclohexene dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclo-hexylmethyl) adipate, e.g., "ERL-4289" (obtained from Union Carbide Corp.), dipentene dioxide, e.g., "ERL-4269" (obtained from Union Carbide Corp.) 2-(3,4-epoxycyclohexyl-5,5-spiro-3,4-epoxy)cyclohexane metadioxane, e.g., "ERL-4234" (obtained from Union Carbide Corp.) and epoxidized poly-butadiene, e.g., "Oxiron 2001" (obtained from FMC Corp.)

Other suitable cycloaliphatic epoxides include those described in U.S. Pats. Nos. 2,750,395; 2,890,194; and 3,318,822 which are incorporated herein by reference, and the following:

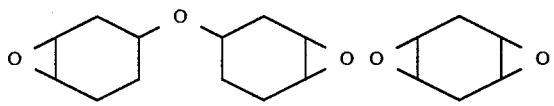

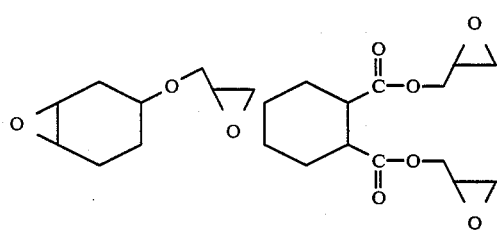

-continued

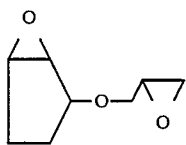

Other suitable epoxides include:

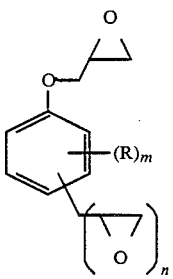

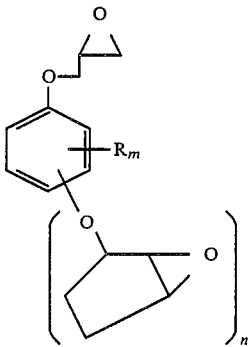

where n is 1 to 4, m is (5−n), and R is H, halogen, or $C_1$ to $C_4$ alkyl.

Reactive diluents containing one epoxide group such as t-butylphenyl glycidyl ether, may also be used. The reactive diluent may be used in place of or in combination with the coepoxides listed above.

The preferred coepoxy resins are bisphenol A epoxy resins of formula XII where n is between 0 and 5, epoxidized novolak resins of formula XIII and XIV where n is between 0 and 3. N,N,N',N'-tetraglycidyl xylylenediamine, and N,N, N',N'-tetraglycidyl 4,4'-diamino diphenyl methane.

The coepoxide may be used in amounts of up to 35 percent by weight of the epoxide component.

The thermoplastic polymers suitable for use in this invention include phenoxy, polycaprolactone, polyetherimide, and polyarylether of the formula

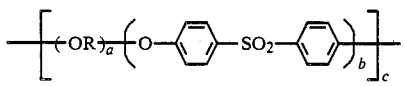

where R is selected from the residuum of hydroquinone, dihydroxydiphenyl sulfone, or 4,4'-biphenol, a is 1, b is 1 or greater, and c is 5 to 100.

Phenoxy polymers are thermoplastic polyhydroxy ethers which have the formula

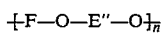

wherein F is the radical residuum of a dihydric phenol, E" is a radical residuum of an epoxide selected from mono and diepoxides and which contain from 1 to 2 hydroxyl groups, and n is an integer which represents the degree of polymerization and is at least about 20 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art. Typical processes are described in U.S. Pat. Nos. 3,238,087; 3,305,528; and 3,277,051.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

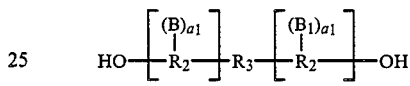

wherein $R_2$ is an aromatic divalent hydrocarbon radical, such as naphthylene and phenylene with phenylene being preferred, B and $B_1$ may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine, or alkoxy radicals such as methoxy, methoxymethyl, ethoxy, ethoxyethyl, n-butyloxy, amyloxy and the like, preferably an alkoxy radical having 1 to 4 carbon atoms, a and $a_1$ are independently integers of 0 to 4, $R_3$ is alkylene, alkylidene, cycloalkylene or a saturated divalent group. Particularly preferred are dihydric polynuclear phenols having the general formula:

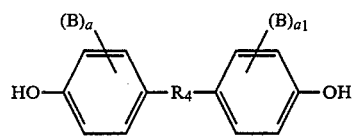

wherein B, $B_1$, a, and $a_1$ are as previously defined, and $R_4$ is an alkylene or alkylidine group, preferably having from 1 to 3 carbon atoms, or cycloalkylene having 6 to 12 carbon atoms.

Diepoxides useful for the preparation of polyhydroxyethers may be represented by repeating units of the following formula:

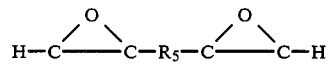

wherein $R_5$ is representative of a bond between adjacent carbon atoms or a divalent organic radical such as an aliphatic, aromatic, cyclic, heterocyclic or acylic arrangement of atoms.

Polycaprolactone is a thermoplastic polymer of the formula

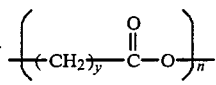

wherein y is 4 or 5 and n is 15 and 300, preferably, 40 and 20. Polycaprolactones are prepared by heating caprolactone monomer in the presence of catalytic amounts of organotin compounds such as stannous octoate.

The polyetherimides suitable for use in this invention are well known in the art and are described in, for example, U.S. Pat. Nos. 3,847,867, 3,838,097 and 4,107,147.

The polyetherimides are of the following formulae:

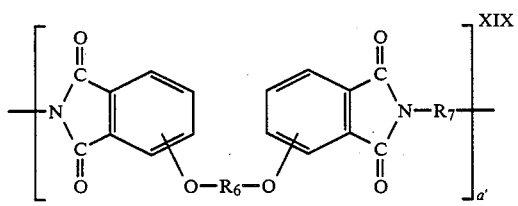
XIX wherein a' is an integer greater than 1, preferably from about 10 to about 10,000 or more, —O—$R_6$—O— is attached to the 3 or 4 and 3' or 4' positions and $R_6$ is selected from (a) a substituted or unsubstituted aromatic radical such as

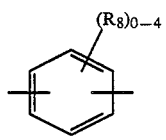

or

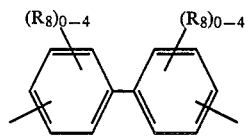

(b) a divalent radical of the formula:

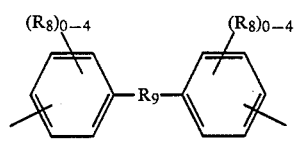

wherein $R_8$ is independently $C_1$ to $C_6$ alkyl, or halogen and $R_9$ is selected from —O—, —S—.

—$SO_2$—, —SO—, alkylene of 1 to 6 carbon atoms, cycloalkylene of 4 to 8 carbon atoms, alkylidene of 1 to 6 carbon atoms or cylcoalkylidene of 4 to 8 carbon atoms, $R_7$ is selected from an aromatic hydrocarbon radical having from 6-20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms, $C_2$-$C_8$ alkylene terminated polydiorganosiloxane and a divalent radical of the formula

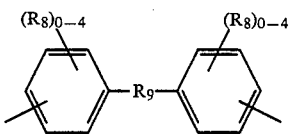

wherein $R_8$ and $R_9$ are as previously defined, and $R_9$ may be a direct bond.

The polyetherimides can, for example, be obtained by any of the methods well-known to those skilled in the art including the reaction of any aromatic bis(ether anhydride)s of the formula

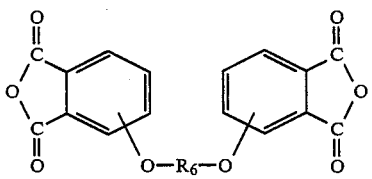
XXI where $R_6$ is as defined hereinabove, with a diamino compound of the formula $H_2N$—$R_7$—$NH_2$ (XXII)

where $R_7$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and the diamines, at temperatures of from about 20° to about 250° C. Alternatively, the polyetherimides can be prepared by melt polymerization of any dianhydride of Formula XXI with any diamino compound of Formula XXII while heating the mixture of the ingredients at elevated temperatures with concurrent intermixing. Generally, melt polymerization temperatures between about 200° C. to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides. However, in certain instances, a slight molar excess (about 1 to 5 mol percent) of diamine can be employed resulting in the production of polyetherimides having terminal amine groups. Generally useful polyetherimides of formula XIX have an intrinsic viscosity greater than 0.2 deciliters per gram, preferably 0.35 to 0.60, or 0.7 deciliters per gram or even higher when measured in m-cresol at 25° C.

A preferred polyetherimide has the structure

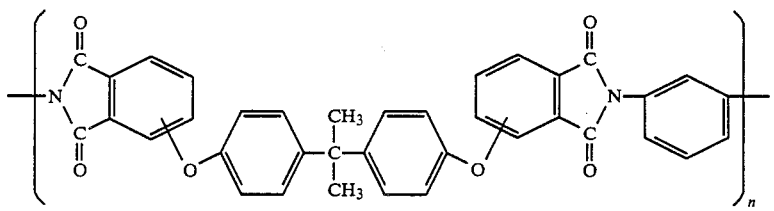

where n is between 20 and 60.

The composition may additionally contain an accelerator to increase the rate of cure and also a structural fiber.

Accelerators which may be used herein include Lewis acid:amine complexes such as BF₃.monoethylamine, BF₃.piperdine, BF₃.2-methylimidazole; amines, such as imidazole and its derivatives such as 4-ethyl-2-methylimidazole, 1-methylimidazole, 2-methylimidazole; N,N-dimethylbenzylamine; acid salts of tertiary amines, such as the p-toluene sulfonic acid-;imidazole complex, salts of trifluoro methane sulfonic acid, such as FC-520 (obtained from 3M Company), organophosphonium halides and dicyandiamide.

The structural fibers which are useful in this invention include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E.I. duPont de Nemours, Inc., Wilmington, Del.), and silicon carbide fibers.

The compositions contain 5 to 70 weight percent, preferably 15 to 60 percent, of epoxy resin 5 to 75 percent, preferably 10 to 50 percent, of hardener and 1 to about 25 percent, preferably 2 to 20 percent by weight of thermoplastic polymer. If fiber is present, it is used in amounts of from 1 to about 85 percent by weight, preferably from about 20 to about 85 percent by weight.

The preferred composition contains structural fiber.

Preimpregnated reinforcement may be made from the compositions of this invention by combining components (a+b+c) with structural fiber.

Preimpregnated reinforcement may be prepared by several techniques known in the art, such as wet winding or hot melt. In one method of making impregnated tow or undirectional tape, the fiber is passed into a bath of the epoxy/hardener/thermoplastic mixture. A nonreactive, volatile solvent such as methyl ethyl ketone or dichloroethane may be optionally included in the resin bath to reduce viscosity. After impregnation, the reinforcement is passed through a die to remove excess resin, sandwiched between plies of release paper, passed through a set of heated rollers, cooled, and taken up on a spool. It is used within a few days or may be stored for months at 0° F.

During prepreg manufacture, the resin system "B-stages", or partially advances.

Composites may be prepared by curing preimpregnated reinforcement using heat and pressure. Vacuum bag/autoclave cures work well with these compositions. Laminates may also be prepared via wet layup followed by compression molding, resin transfer molding, or by resin injection, as described in European Patent Application No. 0019149 published Nov. 26, 1980. Typical cure temperatures are 100° F. to 500° F., preferably 180° F. to 450° F.

The compositions of this invention may also be used in filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

The preferred epoxy resin mixtures have viscosities less than 2,000 centipoises at 70° C.

For all prepreg and composite formulations, the preferred molar ratio of N—H groups in the hardener to 1,2-epoxide groups in the epoxy resin is 0.5 to 1.5.

The compositions of this invention may be used as aircraft parts such as wing skins, wing-to-body fairings, floor panels, flaps, radomes; as automotive parts such as driveshafts, bumpers, and springs; and as pressure vessels, tanks and pipes. They are also suitable for protective armor on military vehicles and sporting goods applications such as golf shafts, tennis rackets, and fishing rods.

EXAMPLES

The following examples serve to give specific illustrations of the practice of this invention but they are not intended in any way to limit the scope of this invention.

The following designations used in the examples have the following meaning:

The epoxy equivalent weight (EEW) is the grams of epoxy resin per mole of 1,2-epoxide group.

Phenoxy—a polymer (Ucar phenoxy PKHH obtained from Union Carbide Corporation) of the following formula:

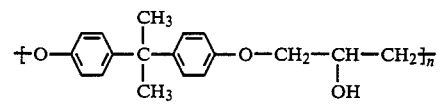

This polymer had a number average molecular weight of about 24,000.

Polycaprolactone—a polymer (PCL-700 obtained from Union Carbide Corporation) of the following formula:

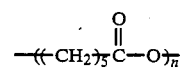

This polymer had a number average molecular weight of about 16,000.

Polyetherimide—a polymer (Ultem 1000, obtained from General Electric Company) of the following formula:

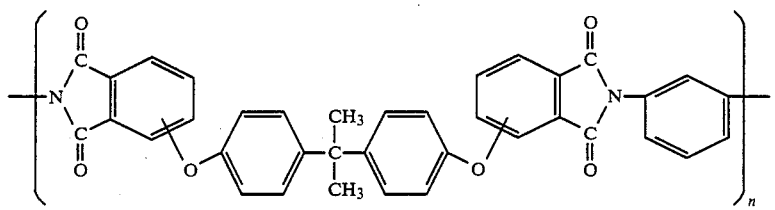

This polymer had a number average molecular weight of about 20,000.

Polyethersulfone—a polymer (P-200 obtained from Imperial Chemical Industries) of the following formula:

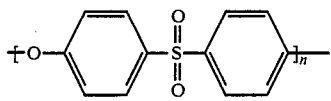

This polymer had a number average molecular weight of about 24,000.

Polycarbonate—a polymer (Lexan 101 obtained from General Electric Company) of the following formula:

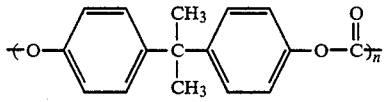

This polymer had a reduced viscosity of 0.64 dl/g as measured in chloroform at 25° C. at a concentration of 0.2 g/dl.

Polysulfone—a polymer (P3703 obtained from Union Carbide Corporation) of the following formula:

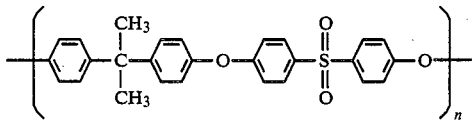

This polymer had a number average molecular weight of about 18,000.

CONTROL A

A thermosetting epoxy resin formulation was prepared by blending 203 g of bis(2,3-epoxycyclopentyl)ether (EEW 92) with 119 g of 4,4'-diaminodiphenyl methane.

EXAMPLE 1

A solution was prepared by blending 50 g of Phenoxy with 450 g of bis(2,3-epoxycyclopentyl)ether at 130° C. for 3 hours under nitrogen. A thermosetting epoxy resin formulation was prepared by combining a 120 g portion of the Phenoxy/epoxy blend with 64 g of 4,4'-diaminodiphenyl methane.

EXAMPLE 2

A solution was prepared by blending 50 g of Polycaprolactone with 450 g of bis(2,3-epoxycyclopentyl)ether at 110° C. for 2 hours. A thermosetting epoxy formulation was prepared by combining a 340 g portion of the Polycaprolactone/epoxy solution with 179 g of 4,4'-diaminodiphenyl methane.

EXAMPLE 3

Bis(2,3-epoxycyclopentyl)ether, 900 g and 100 g of Polyetherimide were dissolved in 500 g of methylene chloride; the solvent was removed by stirring the solution under vacuum at 60° C. over a 4 hour period.

A thermosetting epoxy resin formulation was prepared by combining a 130 g portion of this solution with 69 g of 4,4'-diaminodiphenyl methane.

EXAMPLE 4

A solution of Polyethersulfone in bis(2,3-epoxycyclopentyl)ether was prepared by heating 50 g of Polyethersulfone with 450 g of the diepoxide for 3 hours at 130° C. under nitrogen. A thermosetting epoxy resin formulation was prepared by combining a 120 g of this solution with 64 g of 4,4'-diaminodiphenyl methane.

CONTROL B

A solution of Polycarbonate in epoxy resin was prepared by heating 50 g of Polycarbonate in 450 g of bis(2,3-epoxycyclopentyl)ether for 3 hours at 130° C. under nitrogen. A thermosetting epoxy resin formulation was prepared by combining a 120 g portion of the Polycarbonate/epoxy blend with 64 g of 4,4'-diaminodiphenyl methane.

CONTROL C

A solution of Polysulfone in diepoxide was prepared by heating 36 g of Polysulfone in 320 g of bis(2,3-epoxycyclopentyl)ether for 3 hours at 130° C. under nitrogen. A thermosetting epoxy resin formulation was prepared by combining a 150 g portion of this solution with 80 g of 4,4'-diaminodiphenyl methane.

CONTROL D

A thermosetting epoxy resin formulation was prepared by combining a 140 g portion of bis(2,3-epoxycyclopentyl)ether with 41 g of meta-phenylenediamine.

EXAMPLE 5

A solution was prepared by blending 50 g of Phenoxy with 450 g of bis(2,3-epoxycyclopentyl)ether at 130° C. for 3 hours under nitrogen. A thermosetting epoxy resin formulation was prepared by combining a 154 g portion of the Phenoxy/epoxy blend with 40 g of meta-phenylenediamine.

EXAMPLE 6

A solution was prepared by blending 50 g of Polycaprolactone with 450 g of bis(2,3-epoxycylcopentyl)ether at 110° C. for 2 hours. A thermosetting epoxy formulation was prepared by combining a 153 g portion of this solution with 40 g of meta-phenylenediamine.

EXAMPLE 7

Bis(2,3-epoxycyclopentyl)ether, 900 g and 100 g of Polyetherimide were dissolved in 500 g of methylene chloride. The solvent was removed by stirring the solution under vacuum at 60° C. over a 4 hour period.

A thermosetting epoxy resin formulation was prepared by combining a 151 g portion of the Polyetherimide/epoxy blend with 40 g of meta-phenylenediamine.

EXAMPLES 8 TO 14 AND CONTROLS E TO H

Unreinforced castings were prepared from the formulations described in Examples 1 through 7 and Controls A through D. The castings were made using the proportions given in the above Examples and Controls. Casting dimensions were $\frac{1}{8} \times 8 \times 5$ to 8 inches. Typically they weighed 100 to 160 g.

The general procedure for making castings was the following: The thermoplastic/epoxy blend was charged to a 3-necked flask equipped with a paddle stirrer. The contents of the flask were heated to 85° C. and stirred. The amine hardener was added to this solution. It dissolved in about 2 to 5 minutes. The resulting solution was subjected to a vacuum to remove air bubbles for about 5 to 10 minutes. It was then poured into a preheated glass mold with a cavity of dimensions $\frac{1}{2} \times 8 \times 8$ inches, and cured with a programmed heating cycle: 6 to 8 hours at 85° C., 4 hours at 120° C., and finally 4 hours at 160° C.

Castings were tested to determine tensile properties and heat deflection temperature. Tensile properties were measured according to ASTM D-638 using a Type I dogbone specimen. Heat deflection temperatures were measured according to ASTM D-648 (264 psi stress).

Table I summarizes the properties of unreinforced castings cured with 4,4'-diaminodiphenyl methane. The compositions of this invention afford castings with higher tensile strains-to-failure than the controls. The heat deflection temperature of the casting modified with polycaprolactone was essentially the same as that of the unmodified control (i.e., Control A). Improved tensile strain-to-failure are noted for compositions modified with phenoxy, polycaprolactone, polyetherimide, and polyethersulfone, but not with polycarbonate or polysulfone.

Table II summarizes the properties of unreinforced castings cured with meta-phenylenediamine. Higher tensile strains-to-failure are noted for compositions containing phenoxy, polycaprolactone, and polyetherimide. Heat deflection temperatures of the thermoplastic-modified castings are very similar to that of the unmodified control (i.e., Control D).

TABLE I

PROPERTIES OF UNREINFORCED CASTINGS MADE WITH 4,4'-DIAMINODIPHENYL METHANE

| CASTING EXAMPLE | Control E | 8 | 9 | 10 | 11 | Control F | Control G |
|---|---|---|---|---|---|---|---|
| RESIN FORMULATION (Total Weight Percent) | Control A | Example 1 | Example 2 | Example 3 | Example 4 | Control B | Control C |
| THERMOPLASTIC, TYPE AMOUNT (wt. %)[a] | NONE | Phenoxy (6.5) | Polycaprolactone (6.5) | Polyetherimide (6.5) | Polyethersulfone (6.5) | Polycarbonate (6.5) | Polysulfone (6.5) |
| TENSILE STRENGTH ($10^3$ psi) | 15.6 | 15.3 | 15.3 | 16.2 | 15.9 | 11.9 | 14.1 |
| TENSILE MODULUS ($10^5$ psi) | 5.3 | 4.8 | 4.6 | 5.1 | 5.0 | 5.5 | 5.0 |
| STRAIN-TO-FAILURE (%) | 6.3 | 7.7 | 7.3 | 8.6 | 8.0 | 3.0 | 4.4 |
| HEAT DEFLECTION TEMPERATURE (°C.) | 187 | — | 186 | — | — | 180 | — |

[a]Based to total weight of the composition
— Not measured

TABLE II

PROPERTIES OF UNREINFORCED CASTINGS CURED WITH META-PHENYLENE DIAMINE

| CASTING EXAMPLE | Control H | 12 | 13 | 14 |
|---|---|---|---|---|
| RESIN FORMULATION | Control D | Example 5 | Example 6 | Example 7 |
| THERMOPLASTIC, TYPE AMOUNT (wt. %)[a] | NONE | Phenoxy (7.9) | Polycaprolactone (7.9) | Polyetherimide (7.9) |
| TENSILE STRENGTH ($10^3$ psi) | 15.7 | 15.8 | 14.8 | 15.8 |
| TENSILE MODULUS ($10^5$ psi) | 6.6 | 5.9 | 5.3 | 6.2 |
| STRAIN-TO-FAILURE (%) | 3.0 | 4.0 | 5.0 | 4.0 |
| HEAT DEFLECTION TEMPERATURE (°C.) | 192 | 189 | 188 | 187 |

[a]Based on total weight of the composition

What is claimed is:

1. A thermoplastic modified epoxy composition comprising:
   (a) a bis(2,3-epoxycyclopentyl)ether.
   (b) a diamine hardener selected from one or more of 4,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, 3,3'-diaminobenzophenone, m- phenylenediamine, p-phenylenediamine, 4,4'-diaminodiphenylpropane, 4,4'-diaminodiphenyl sulfide, 1,4-bis(p-aminophenoxy)benzene, 1,4-bis(m-aminophenoxy)benzene, 1,3-bis-(m-aminophenoxy)benzene, 1,3-bis(p-aminophenoxy)benzene, adducts of epoxy resin with the above diamines, or the adducts of a bisphenol-A epoxy resin with a molar excess of 4,4-diaminodiphenyl sulfone, and (c) a thermoplastic selected from one or more of the following: polycaprolactone, polyetherimide, phenoxy, polyarylether of the formula:

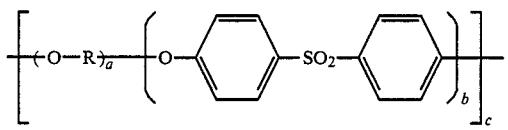

wherein R is selected from the residuum of hydroquinone, dihydroxydiphenyl sulfone or 4,4'-biphenol, a is 1, b is 1 or greater, and c is 5 to 100.

2. A composition as defined in claim 1 which contains an epoxy resin containing two or more epoxy groups and which is different from (a).

3. A composition as defined in claim 2 wherein the epoxy resin is of the following structure:

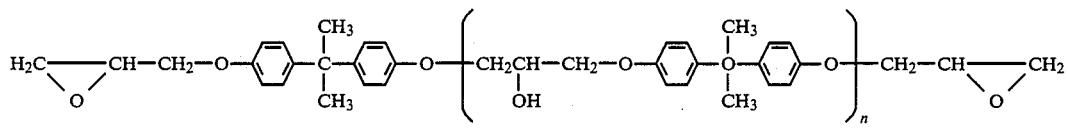

where n has a value from about 0 to about 15.

4. A composition as defined in claim 2 wherein the epoxy resin is a phenol-formaldehyde novolak of the following formula:

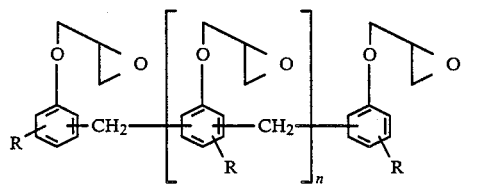

wherein n=0.1 to 8 and R=hydrogen.

5. A composition as defined in claim 2 wherein the epoxy resin is a cresol-formaldehyde novolak of the following formula:

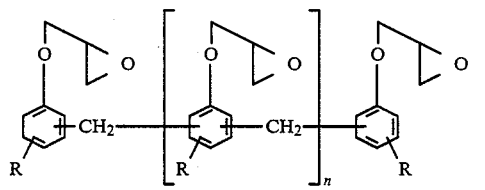

wherein n=0.1 to 8 and R is $CH_3$.

6. A composition as defined in claim 2 wherein the epoxy resin is N,N,N'N'-tetraglycidyl-4,4'-diaminodiphenyl methane.

7. A composition as defined in claim 2 wherein the epoxy resin is N,N,N',N'-tetraglycidyl-xylylenediamine.

8. A composition as defined in claim 2 wherein the epoxy resin is N,N-diglycidyl toluidene.

9. A composition as defined in claim 2 wherein the epoxy resin is N,N-diglycidyl aniline.

10. A composition as defined in claim 2 wherein the epoxy resin is N,N,N',N'-tetraglycidylbis(methylamino)cyclohexane.

11. A composition as defined in claim 2 wherein the epoxy resin is diglycidyl isophthalate.

12. A composition as defined in claim 2 wherein the epoxy resin is diglycidyl terephthalate.

13. A composition as defined in claim 2 wherein the epoxy resin is O,N,N-triglycidyl-4-amino phenol or O,N,N-triglycidyl-3-aminophenol.

14. A composition as defined in claim 2 wherein the epoxy resin is 3,4-epoxycyclohexylmethyl 3,4-epoxycyclohexane carboxylate.

15. A composition as defined in claim 2 wherein the epoxy resin is a N,N'-diglycidyl derivative of dimethylhydantoin.

16. A composition as defined in claim 1 which contains a structural fiber selected from carbon, graphite, glass, silicon carbide, poly(benzothiazole), poly(benzimidazole), poly(benzoxazole), alumina, titania, boron, and aromatic polyamides.

17. A composition as defined in claim 1 which contains an accelerator which initiates the rate of cure.

18. A prepreg comprising
(a) a bis(2,3-epoxycyclopentyl)ether,
(b) a diamine hardener selected from one or more of 4,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, 3,3'-diaminobenzophenone, m-phenylenediamine, p-phenylenediamine, 4,4'-diaminodiphenylpropane, 4,4'-diaminodiphenyl sulfide, 1,4-bis(p-aminophenoxy)benzene, 1,4-bis(m-aminophenoxy)benzene, 1,3-bis-(m-aminophenoxy)benzene, 1,3-bis(p-aminophenoxy)benzene, adducts of epoxy resin with the above diamines, or the adducts of a bisphenol-A epoxy resin with a molar excess of 4,4-diaminodiphenyl sulfone,
(c) a thermoplastic selected from one or more of the following: polycaprolactone, polyetherimide, phenoxy, polyarylether of the formula:

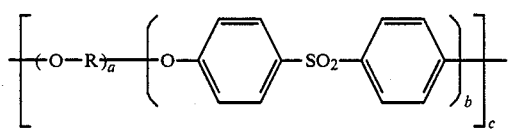

wherein R is selected from the residuum of hydroquinone, dihydroxydiphenyl sulfone or 4,4'-biphenol, a is 1, b is 1 or greater, and c is 5 to 100, and (d) a structural fiber.

19. A prepreg as defined in claim 19 which contains an accelerator which increases the rate of cure.

20. A composite comprising:
(i) a matrix resin comprising:
(a) bis(2,3-epoxycyclopentyl)ether,
(b) a hardener selected from one or more of 4,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, 3,3'-diaminobenzophenone, m-phenylenediamine, p-phenylenediamine, 4,4'-diaminodiphenylpropane, 4,4'-diaminodiphenyl sulfide, 1,4-bis(p-aminophenoxy)benzene, 1,4-bis(m-aminophenoxy)benzene, 1,3-bis-(m-aminophenoxy)benzene, 1,3-bis(p-aminophenoxy)benzene, adducts of epoxy resin with the above diamines, or the adducts of a bisphenol-A epoxy resin with a molar excess of 4,4-diaminodiphenyl sulfone,
(c) a thermoplastic selected from one or more of the following: polycaprolactone, polyetherimide, phenoxy, polyarylether of the formula:

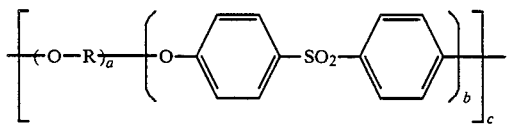

wherein R is selected from the residuum of hydroquinone, dihydroxydiphenyl sulfone or 4,4'-biphenol, a is 1, b is 1 or greater, and c is 5 to 100, and
(ii) a structural fiber.

21. A composite as defined in claim 20 wherein the epoxy resin was cured in the presence of an accelerator which increased the rate of cure.

* * * * *

UNITED STATES PATENT AND TRADEMARK OFFICE
CERTIFICATE OF CORRECTION

PATENT NO.   : 4,567,216
DATED        : January 28, 1986
INVENTOR(S)  : Shahid Qureshi, Hugh C. Gardner It is certified that error appears in the above-identified patent and that said Letters Patent is hereby corrected as shown below:

At column 16, in Table II, the subheading "CASTING EXAMPLE" should be read as if it were positioned one line higher so that it refers to Examples "Control H 12 13 14".

Signed and Sealed this

Thirteenth Day of May 1986

[SEAL]

Attest:

Attesting Officer

DONALD J. QUIGG

Commissioner of Patents and Trademarks